United States Patent Office 3,467,530
Patented Sept. 16, 1969

3,467,530
PROCESS OF FREEZE-DRYING BLUEBERRIES
Rudolph K. Scharschmidt and Ralph Edward Kenyon, Battle Creek, Mich., assignors to General Foods Corporation, White Plains, N.Y., a corporation of Delaware
No Drawing. Filed Aug. 17, 1965, Ser. No. 480,473
Int. Cl. A23b 7/02
U.S. Cl. 99—204
4 Claims

ABSTRACT OF THE DISCLOSURE

Rapidly rehydratable dehydrated blueberries are prepared by freezing blueberries, puncturing them while in the frozen state and freeze drying the punctured berries.

The invention relates to a novel blueberry and process of manufacturing same. More particularly the invention pertains to a process for converting blueberries into a form whereby, after dehydration, they will rehydrate readily.

Blueberries comprise a skin or integument surrounding a pulpy pectinous core high in sugars. Generally when blueberries are consumed with other forms of comestibles such as ready-to-eat breakfast cereals they form a most flavorful preparation in the presence of milk and/or cream with sugar. Preservation of blueberries for use in combination with ready-to-eat breakfast cereals dictates that the blueberries be dehydrated. Dehydrated blue-berries are not readily rehydratable in milk, cream, or other aqueous liquids.

Briefly, the present invention is founded upon the discovery that when blueberries are perforated by one or more needles or like penetrating protuberances, hereinafter referred to for convenience as "pins," in a manner wherein the pins puncture not only the outer integument or skin portions but also a substantial amount of the interior core portion, the thus perforated blueberry can be freeze dried to a form which readily rehydrates. Preparatory to puncturing the blueberry it is frozen, ideally at a very slow rate, preferably in the neighborhood of 10–20 hours, to a temperature of 0° F. and below. It has been found that when a frozen blueberry is so punctured the freeze dried product does not shrivel or otherwise undergo change in the physical appearance of the outer integument portion and instead dries in a substantially unwrinkled bulbous spherical shape. This behavior is to be contrasted with attempts of prior art workers to freeze dry blueberries, as a result of which freeze drying attempts the blueberries have been observed to undergo a distinct shriveling which does not disappear when the product is eventually rehydrated in milk, cream, or other aqueous liquid. Importantly, however, the thus punctured and freeze dried fruit will rehydrate in an aqueous preparation such as milk or cream in a period of 30 seconds to 3 minutes, depending upon such factors as size of the berry, degree of maturity, particular freezing rate employed prior to puncturing, climatic variations, etc. This rehydration rate is to be contrasted with that of blueberries which have been simply freeze dried under comparable freezing and freeze drying conditions but which have not been so punctured, the rate being 30 minutes and more.

Collaterally and advantageously, puncturing of the blueberry in the frozen form facilitates the transfer of frozen water from the aforesaid core portion in the vapor form. As a result the total elapsed time of freeze drying the thus punctured blueberry down to the desired stable moisture level of less than 3% will be in the neighborhood of 18 hours or less, which will be in the order of ⅔ or less of the time normally required to freeze dry an unpunctured blueberry.

It is an important and novel feature of this invention that not only the integument portion of the blueberry is punctured but also a substantial amount of the core portion is punctured. It is preferred practice in accordance with this invention to puncture the integument and the core portion after the blueberry has been frozen; it is nevertheless within the bounds of the present discovery that similar improvements in rates of dehydration and rehydration can be realized when the fruit is thus punctured prior to freezing. While one puncture will suffice to provide improvements in rates of dehydration and rehydration, it may also be preferable to provide more than one such perforation say between an average of 2 and 3 punctures per berry, depending upon the size of the berry, the larger berries generally calling for a larger number of perforations. The pin referred to herein above should be so located with respect to the means whereby the berry it punctures that it not only ruptures the aforesaid integument or skin portion but also penetrates a substantial part of the core portion; typically each pin puncture will cause the core portion to be ruptured along a depth of penetration of approximately ⅓ to ⅔ of the mean diameter of the blueberry.

Since fruit will vary in diameter it wil be a preferred practice in accordance with this invention to grade the fruit according to size so that there will be a minimum variation in the average particle size of the blueberry. Thereafter the graded berry will be introduced to the space between a pair of oppositely rotating rolls designed to afford in a predictable and controllable manner the aforesaid degree of penetration. The rolls will have spaced annular grooves therein along the longitudinal length of the rolls, the grooves serving to orient the berries as they are deposited co-axialy from above onto the pinch between two adjacent rolls; this roll will aso preferably contain longitudinal grooves. The annular rings will thus run parallel to one another and serve to orient the blueberries so that they are introduced in a controllable manner to the locus of the free ends of pins suitably mounted on the adjacent roll and adapted to intersect the blueberries in the annular grooves of the first described roll. The longitudinal grooves are located around the cylindrical surface of the roll so as to assure the provision of a positive feed of blueberries to the point at which the berries are punctured by the pins.

The adjacent roll will be adapted to puncture the blueberries located on the first-described roll, comprising a cylinder having a plurality of longitudinal rows of parallel pins, adjacent pins being spaced from one another in each row on feeders less than the anticipated mean diameter of the blueberry, and the pins having a height from the surface of the cylinder sufficient to assure penetration of the blueberry by the free end of the pin. The locuses of the free ends of the pins form annuli which are spaced from the rubber roll and annular grooves therein but are sufficiently proximate to the surface of the rubber coated roll to assure that the free ends of the pins will puncture the blueberries. Preferably the afore described blueberry perforating rolls will be duplicated two or more times by locating a second and third series of like rolls beneath the first set.

The blueberries in practice are frozen preferably over a total elapsed time of 17–19 hours, during which time the blueberries are reduced gradually from ambient room temperature to the freezing point plateau of the water in the blueberry and eventually further reduced in temperature to 0°–10° F. The solidified frozen blueberries will then be fed to the afore described apparatus, passing between the first, second and third sets of rolls. Preferably the pre-frozen blueberries will be tempered, that is, allowed to rise in temperature to above 0° F. and typically to a temperature of 15–25° F., whereafter the blueberries will feed to the perforating apparatus. As a result of this tempering the aforesaid puncturing of the berries by the pin means will be facilitated and the blueberries themselves will be less prone to shatter incident to penetration. Thereafter the frozen blueberries will be introduced to any conventional freezing drying apparatus such a shelf type vacuum freeze dryer wherein blueberries will be loaded to a bed depth of ½" to 1". The blueberries are freeze dried by following any conventional freeze drying profile.

It is important throughout this freeze drying operation that the berry core portion and particularly the liquid phase thereof be maintained in a solidified condition such that there is no "melt-back" of the liquid, at least until a terminal moisture of less than 5% and preferably less than 3% is achieved, since otherwise the fruit will shrivel, that is, the integument will shrink and otherwise distort into a prune-like appearance, having a number of wrinkles which remain in the fruit after it is rehydrated.

What is claimed is:

1. A process for preparing a readily rehydratable dehydrated blueberry comprising:
    (a) freezing the blueberry,
    (b) puncturing the integument and core portion of the frozen blueberry, and
    (c) freeze drying the thus punctured frozen blueberry to a moisture content of less than about 10%.

2. A process according to claim 1 wherein the blueberry is slowly frozen.

3. A process according to claim 2 wherein the slowly frozen blueberry is elevated to a temperature of 15°–25° F. preparatory to being punctured.

4. A process according to claim 2 wherein the blueberry is punctured to the extent that the core portion thereof is caused to have a pin shaped cavity penetrating the core portion for a depth of ⅓ to ⅔ the mean diameter of the blueberry.

References Cited

UNITED STATES PATENTS

| | | | |
|---|---|---|---|
| 2,713,003 | 7/1955 | Rivoche | 99—204 |
| 2,998,041 | 8/1961 | Urschel et al. | 99—199 |
| 3,203,808 | 8/1965 | Thompson et al. | 99—204 |
| 3,395,022 | 7/1968 | Vollink et al. | 99—103 |

FOREIGN PATENTS 783,974   10/1957   Great Britain.

A. LOUIS MONACELL, Primary Examiner

J. M. HUNTER, Assistant Examiner

U.S. Cl. X.R.

99—100